(12) United States Patent
Yi et al.

(10) Patent No.: US 8,564,558 B2
(45) Date of Patent: Oct. 22, 2013

(54) CAPACITIVE TOUCH SCREEN PANEL

(75) Inventors: Youngjin Yi, Paju-si (KR); Seungmok Shin, Daegu (KR); Sohaeng Cho, Goyang-si (KR); Dongsup Kim, Seoul (KR); Sohyung Lee, Ansan-si (KR)

(73) Assignee: LG Display Co., Ltd., Seoul (KR)

( * ) Notice: Subject to any disclaimer, the term of this patent is extended or adjusted under 35 U.S.C. 154(b) by 135 days.

(21) Appl. No.: 12/961,101

(22) Filed: Dec. 6, 2010

(65) Prior Publication Data

US 2012/0050186 A1     Mar. 1, 2012

(30) Foreign Application Priority Data

Aug. 25, 2010   (KR) .................. 10-2010-0082384

(51) Int. Cl.
    *G06F 3/041* (2006.01)
(52) U.S. Cl.
    USPC ..................... 345/173; 178/18.06
(58) Field of Classification Search
    USPC ..................... 178/18.06; 345/173
    See application file for complete search history.

(56) References Cited

U.S. PATENT DOCUMENTS

| | | | |
|---|---|---|---|
| 2010/0171718 A1* | 7/2010 | Denda ........................ | 345/173 |
| 2010/0295819 A1* | 11/2010 | Ozeki et al. .................. | 345/174 |
| 2011/0128240 A1* | 6/2011 | Choi ........................... | 345/173 |

* cited by examiner

*Primary Examiner* — Michael Pervan
(74) *Attorney, Agent, or Firm* — Birch, Stewart, Kolasch & Birch, LLP (57) ABSTRACT

A capacitive touch screen panel includes according to an embodiment a substrate, a plurality of first electrode serials arranged in a first direction on the substrate, a plurality of second electrode serials arranged in a second direction to intersect the first electrode serials, and a plurality of insulation patterns formed at intersections of the first electrode serials and the second electrode serials and electrically insulating the first electrode serials from the second electrode serials. Each of the plurality of first electrode serials includes a plurality of first electrode patterns which are separated from each other, and first connection patterns which are formed under the insulation patterns and electrically connect the neighboring first electrode patterns to each other. In addition, each of the plurality of insulation patterns has a protrusion part formed between the first electrode patterns and the second electrode patterns.

7 Claims, 9 Drawing Sheets

FIG. 1

(RELATED ART)

FIG. 2A

(RELATED ART)

FIG. 2B

(RELATED ART)

FIG. 2C

(RELATED ART)

CAPACITIVE TOUCH SCREEN PANEL

This application claims the priority benefit of Korea Patent Application No. 10-2010-0082384 filed on Aug. 25, 2010, the entire contents of which is incorporated herein by reference for all purposes as if fully set forth herein.

BACKGROUND

1. Field

Embodiments of this invention relate to a touch screen panel.

2. Related Art

In recent years, along with the development of the electronics industry, display devices, such as a liquid crystal display, an electroluminescent display, and a plasma display panel having a quick response speed, low power consumption, and an excellent color reproduction rate, have been in the spotlight. The display device is used for various electronic products such as televisions, monitors for computers, notebook computers, mobile telephones, display units for refrigerators, personal digital assistants, automated teller machines, and the like. In general, the display device interfaces with various input devices such as a keyboard, a mouse, and a digitizer. However, when a separate input device such as a keyboard, a mouse, or digitizer is used, a user is required to know how to use the separate input device, and as the separate input device occupies space, customer dissatisfaction is increased. Therefore, there is increasingly a need for a convenient and simple input device that can reduce erroneous operation. Also, there is a need for a touch screen panel in which a user can input information by directly contacting a screen with a finger or a pen.

Since the touch screen panel has a simple configuration, which minimizes erroneous operations, the user can perform an input action without a separate input device, and can quickly and easily manipulate through contents displayed on a screen.

Touch screen panels are classified into a resistive type, a capacitive type, an electromagnetic type according to a detection method of a touched portion. The resistive type touch screen panel determines a touched position by a voltage gradient according to a change of resistance in a state where a DC voltage is applied to metal electrodes formed on an upper plate or a lower plate. The capacitive type touch screen panel senses a touched position according to a difference in capacitance created in an upper or lower plate when the user physically contacts with a conductive film formed on the upper or lower plate. The electromagnetic type touch screen panel detects a touched portion by reading an LC value induced as an electromagnetic pen touches a conductive film.

Figure 1:
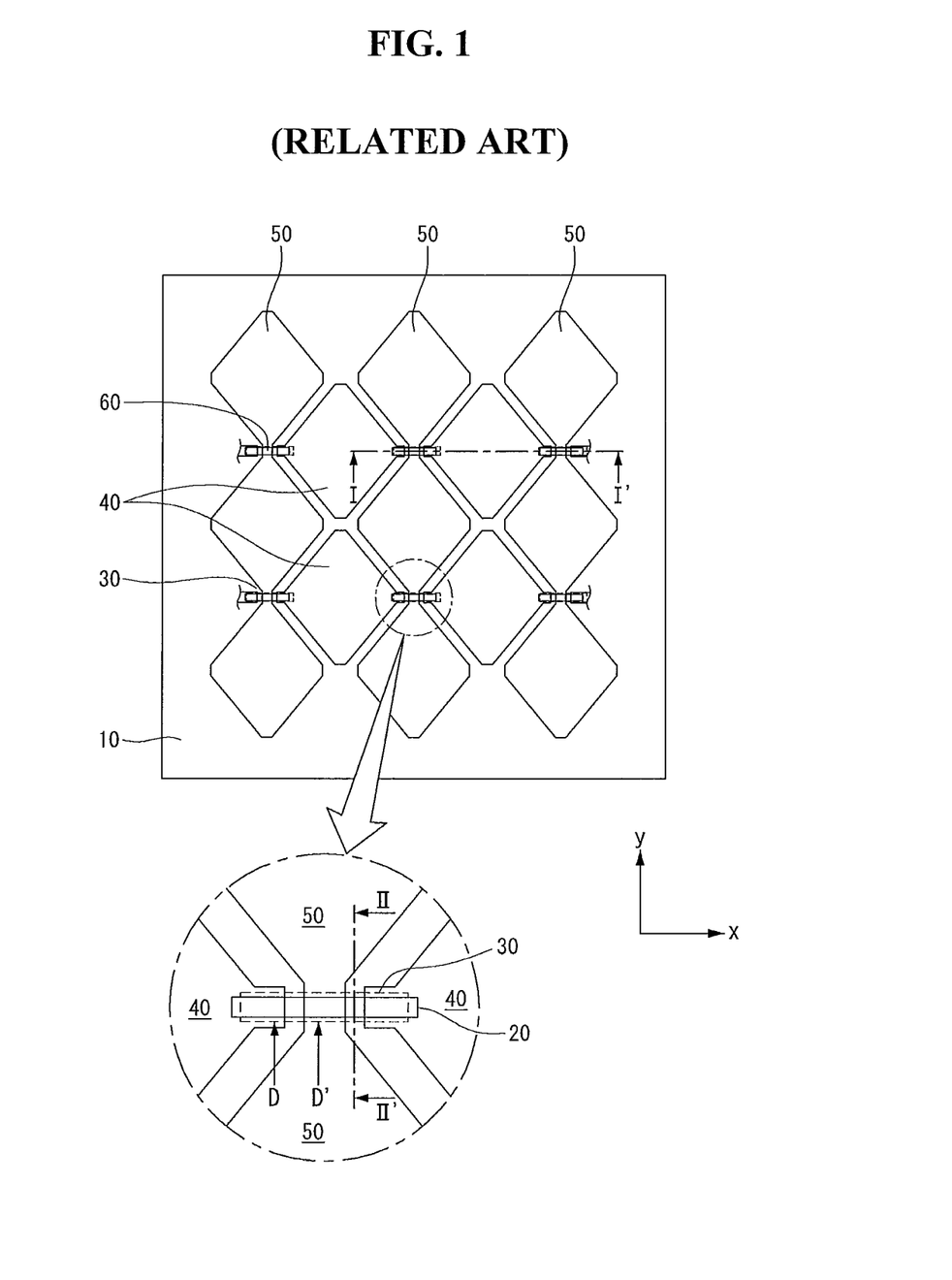
FIG. 1 is a plan view illustrating a capacitive type touch screen panel in the related art.
Figure 2A:
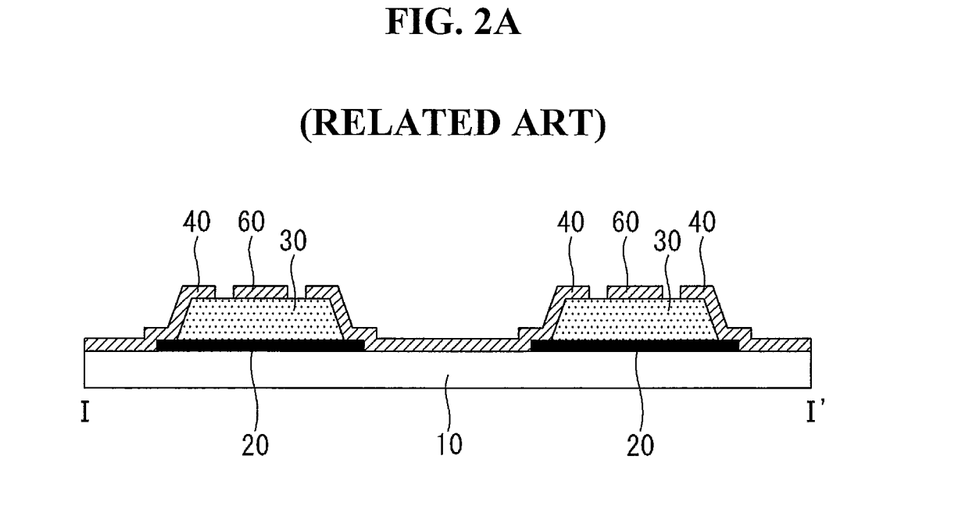
FIG. 2A is a sectional view taken along the line I-I' in the capacitive type touch screen panel in FIG. 1.
Figure 2B:
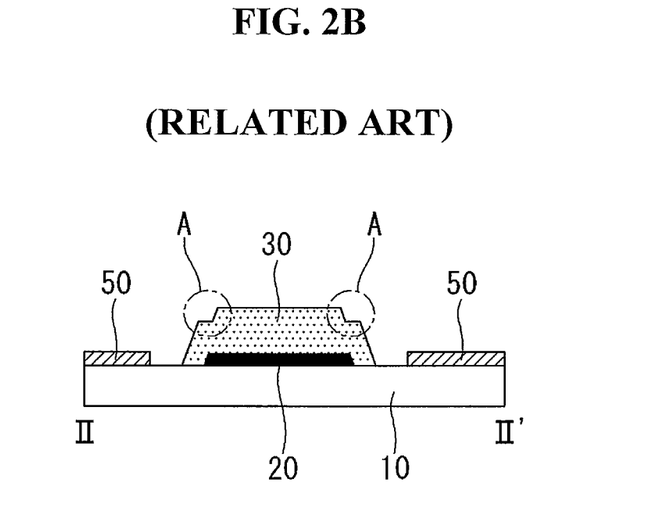
FIG. 2B is a sectional view taken along the line II-II' in the capacitive type touch screen panel in FIG. 1.
Figure 2C:
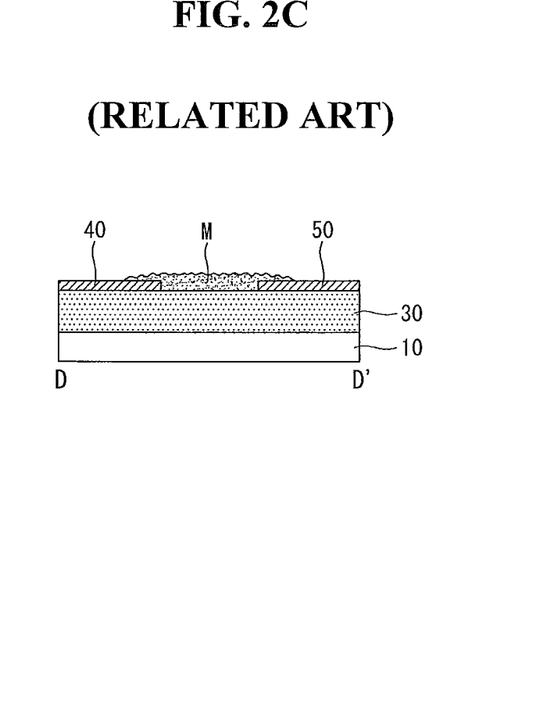
FIG. 2C is a sectional view taken along the line D-D' in FIG. 1, and is a schematic diagram illustrating a state where a first electrode and a second electrode are short-circuited due to undesired conductive particles disposed on an insulation pattern between the first and second electrode patterns.

Hereinafter, a capacitive type touch screen panel in the related art will be described with reference to FIGS. 1, and 2A to 2C. FIG. 1 is a plan view illustrating a capacitive type touch screen panel in the related art, and FIG. 2A is a sectional view taken along the line I-I' in the touch screen panel in FIG. 1, FIG. 2B is a sectional view taken along the line II-II' in the touch screen panel in FIG. 1. FIG. 2C is a sectional view taken along the line D-D' in the touch screen panel in FIG. 1, and is a schematic diagram illustrating a state where undesired conductive particles M positioned on an insulation pattern between electrode patterns causes a first electrode and a second electrode to be short-circuited.

Referring to FIGS. 1, and 2A to 2C, the capacitive type touch screen panel in the related art includes a substrate 10, a plurality of first electrode patterns 40 formed on the substrate 10 and arranged in parallel in a first direction (for example, an X-axis direction), and a plurality of second electrode patterns 50 arranged in parallel in a direction (for example, a Y-axis direction) intersecting the first electrode patterns 40. The touch screen panel also includes insulation patterns 30 which are formed at intersections of the first electrode patterns 40 and the second electrode patterns 40 and electrically insulates the first electrode patterns 40 and the second electrode patterns 50, bridges 20 which are formed on the substrate 10 under the insulation patterns 30 at the intersections of the first electrode patterns 40 and the second electrode patterns 50 and connect the neighboring first electrode patterns 40, and second electrode pattern connection parts 60 which are formed on the insulation patterns 30 and connect the neighboring second electrode patterns 50.

In the capacitive type touch screen panel in the related art, the insulation patterns are formed on the bridges 20 disposed on the substrate 10, and thereby step differences A are formed on the insulation patterns 30 due to the bridges 20, as shown in FIG. 2B. In such a structure, the insulation patterns 30, as shown in the enlarged portion of FIG. 1, typically have a linear form between the first electrode patterns 40 and the second electrode patterns 50. A distance between the first electrode pattern 40 and the second electrode pattern 50 is considerably short and further the insulation pattern 30 has a short path due to the linear form, and thus undesired conductive particles M, which is generated in a process of patterning the first and second electrode patterns 40 and 50, or subsequent processes, are accumulated on the step differences A along a boundary surface 30a of the insulation pattern 30. In this case, as shown in FIG. 2C, there is a problem in that the first electrode pattern 40 and the second electrode pattern 50 are short-circuited.

SUMMARY

Embodiments of this invention provide a touch screen panel capable of preventing first electrode patterns and second electrode patterns from being short-circuited caused by undesired conductive particles by increasing paths of step differences of insulation patterns formed between the first and second electrode patterns.

According to an exemplary embodiment of this invention, there is provided a capacitive touch screen panel including a substrate; a plurality of first electrode serials arranged in a first direction on the substrate; a plurality of second electrode serials arranged in a second direction to intersect the first electrode serials; and a plurality of insulation patterns formed at intersections of the first electrode serials and the second electrode serials and electrically insulating the first electrode serials from the second electrode serials, wherein each of the plurality of first electrode serials includes a plurality of first electrode patterns which are separated from each other, and first connection patterns which are formed under the insulation patterns and electrically connect the neighboring first electrode patterns to each other, wherein each of the plurality of second electrode serials includes a plurality of second electrode patterns which are connected to each other at the intersections, and second electrode pattern connection parts which connect the neighboring second electrode patterns to each other, and wherein each of the plurality of insulation patterns has a protrusion part formed between the first electrode patterns and the second electrode patterns and non-overlapping with the first connection patterns, the second electrode pattern connection parts, the first electrode patterns, and the second electrode patterns.

In the above-described configuration, the protrusion part may include at least one of a bending part and a cut and curved part.

In addition, the protrusion part may include at least two sides forming a first angle with respect to each other, and the first angle being greater than 0° and smaller than 180°. In this case, the at least two sides may include a first side and a second side, the first side extending from the first electrode pattern, and the second side extending from the first side with the first angle to one of the second electrode pattern and the second electrode pattern connection part. Alternatively, the at least two sides may include first to third sides, the first side extending from the first electrode pattern, the second side extending from the first side with the first angle, the third side extending from the second side with a second angle to one of the second electrode pattern and the second electrode pattern connection part, and the second angle being greater than 0° and smaller than 180°.

In the above-described configuration, the first and second angles may be acute angles or obtuse angles.

The first electrode patterns may further include extending parts which cover at least one of end parts of the first connection patterns, and lateral sides and a portion of upper surfaces of the insulation patterns, and the first electrode patterns and the second electrode patterns may be formed on a same surface of the substrate.

It is apparent to those skilled in the art that various modifications, variations and combinations can be made based on the above content.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Hereinafter, embodiments of this document will be described in detail with reference to the accompanying drawings. Like reference numerals designate like elements throughout the specification. In the following description, when a detailed description of well-known functions or configurations related to this document is determined to unnecessarily cloud a gist of the present invention, the detailed description thereof will be omitted.

Names of the respective elements used in the following description are selected for convenience of writing the specification and may be thus different from those in actual products.

Figure 3:
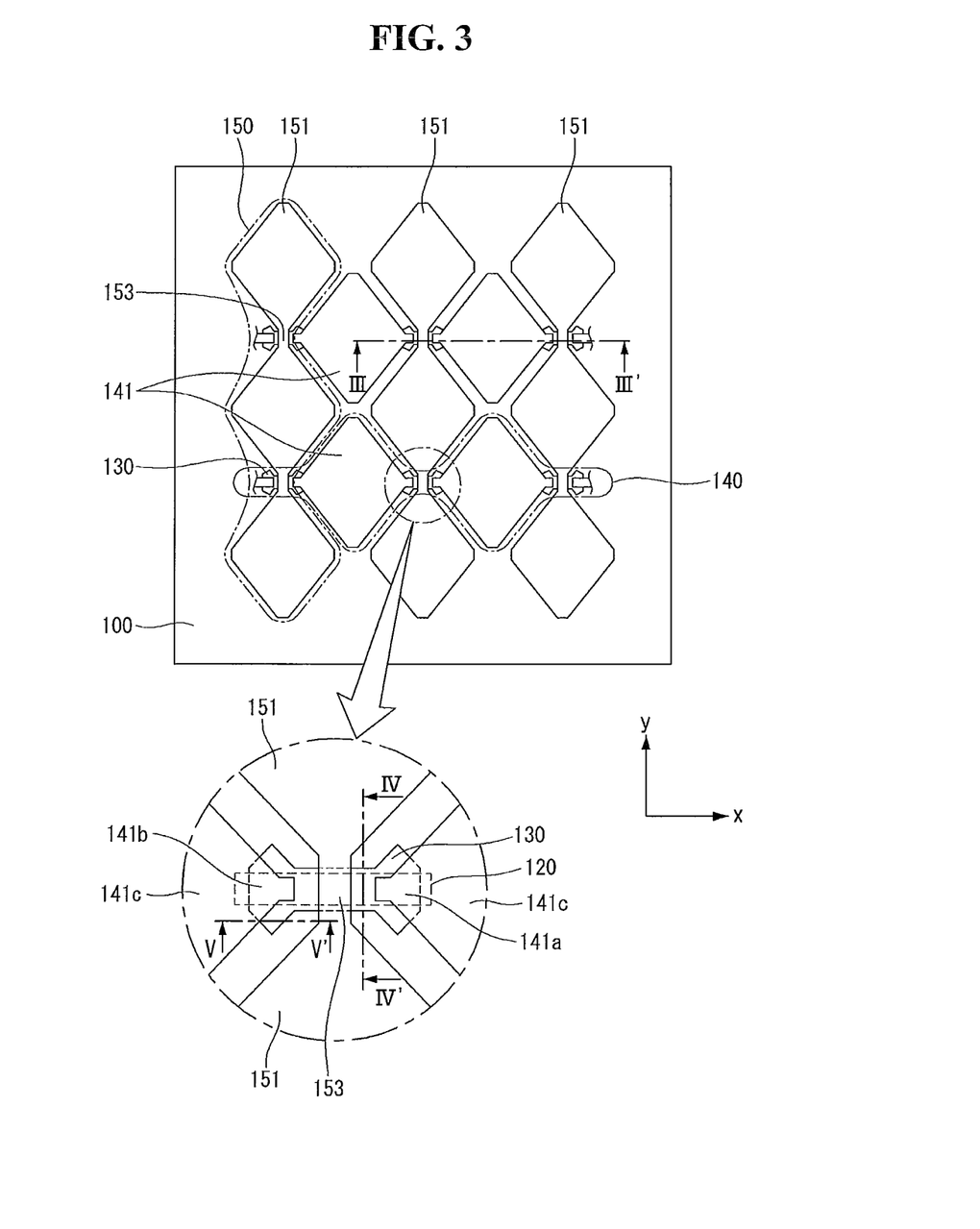
FIG. 3 is a plan view illustrating a capacitive type touch screen panel according to an embodiment of this invention.

The capacitive type touch screen panel according to an embodiment of this invention will be described with reference to FIGS. 3, 4A and 4B. FIG. 3 is a plan view illustrating a capacitive type touch screen panel according to an embodiment of this invention, FIG. 4A is a sectional view taken along the line III-III' in the touch screen panel in FIG. 3, and FIG. 4B is a sectional view taken along the line IV-IV' in the touch screen panel in FIG. 3.

Figure 4A:
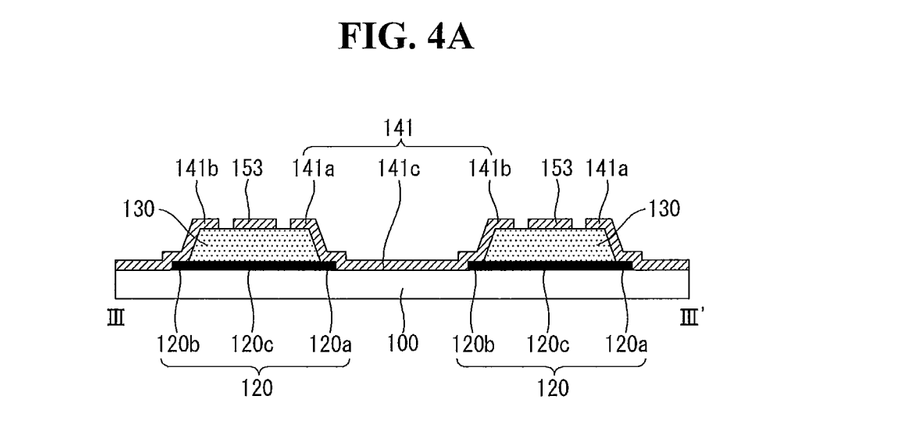
FIG. 4A is a sectional view taken along the line III-III' in the touch screen panel in FIG. 3.
Figure 4B:
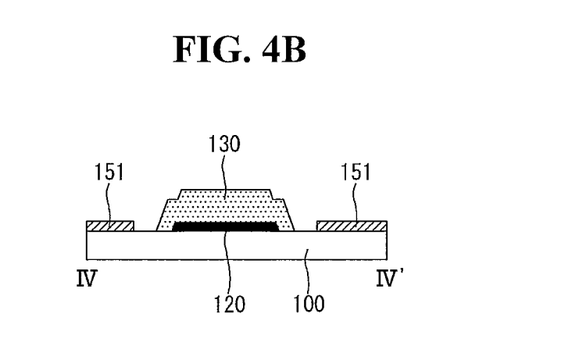
FIG. 4B is a sectional view taken along the line IV-IV' in the touch screen panel in FIG. 3.

Referring to FIGS. 3, and 4A and 4B, the capacitive type touch screen panel includes a substrate 100, a plurality of first electrode serials 140 formed on the substrate 10 and arranged in parallel in a first direction (for example, an X-axis direction or a Y-axis direction), and a plurality of second electrode serials 150 arranged in parallel in a direction (for example, a Y-axis direction or an X-axis direction) intersecting the first electrode serials 140. The touch screen panel also includes a plurality of insulation patterns 130 which are formed at intersections of the first electrode serials 140 and the second electrode serials 150 and electrically insulates the first electrode serials 140 and the second electrode serials 150.

Each of the first electrode serials 140 may include first electrode patterns 141 having a triangle, a rectangle, a square, a quadrangle, a diamond shape, a polygonal shape, or the like, and first connection patterns 120 for connecting neighboring first electrode patterns 141. Each of the second electrode serials 150 may include second electrode patterns 151 having a triangle, a rectangle, a square, a quadrangle, a diamond shape, a polygonal shape, or the like which may be similar to the first electrode patterns 141 and second electrode pattern connection parts 153 for connecting neighboring second electrode patterns 151. Here, there is a difference from each other in that the first connection patterns 120 are formed separately from the first electrode patterns 141, but the second electrode pattern connection parts 153 are integrally formed with the second electrode patterns 151 and are formed on the insulation patterns 130.

In the touch screen panel, the insulation patterns 130 are formed as shown in FIGS. 4A and 4B so as to expose first parts 120a and second parts 120b of the first connection patterns 120 and to cover central parts 120c between the first and second parts 120a and 120b, and therefore the first connection patterns 120 and the second electrode pattern connection parts 153 overlapping with each other are electrically insulated from each other. At this time, the first electrode patterns 141, as shown in FIG. 4A, have first parts 141a which are formed on the first parts 120a of the first connection patterns 120, and on lateral sides and a portion of upper surfaces of the insulation patterns 130, and second parts 141b which are formed on the second parts 120b of the neighboring first connection patterns 120, and on lateral sides and a portion of upper surfaces of the insulation patterns 130 on the neighboring first connection patterns 120. Thereby, the neighboring first electrode patterns 141 are electrically connected to each other via the first connection patterns 120.

As shown in FIG. 4A, the first and second portions 141a and 141b of the first electrode pattern 141 are formed on the first and second portions 120a and 120b of the first connection pattern 120. Furthermore, the first and second portions 141a and 141b of the first electrode pattern 141 are formed lateral sides and upper surface of the insulation patterns 130. Therefore, a misalignment margin between a photomask and a substrate of the touch screen panel can be secured as much as a length of the lateral sides and the upper surface of the insulation patterns 130. Accordingly, although misalignment exists at a process of patterning the first and second electrode patterns 141 and 151, it is possible to appropriately assure electrical contact between the first electrode patterns 141 and the first connection pattern 120.

The insulation patterns 130 will be described more in detail with reference to FIGS. 5A to 5F. As shown in FIGS. 5A to 5F, the insulation pattern 130 includes overlapping regions where the insulation pattern 130 overlaps with other constituent elements including the first connection pattern 120, the second electrode pattern connection part 153, and first electrode patterns 141 and non-overlapping regions where the insulation pattern 130 does not overlap with the other consistent elements. In FIGS. 5A to 5F, regions overlapping with one among the other constituent element are marked with diagonal lines, and regions overlapping with two or more other constituent elements are painted black, such that a single overlapping region, a double overlapping region, and a non-overlapping region are differentiated from each other.

Figure 5A:
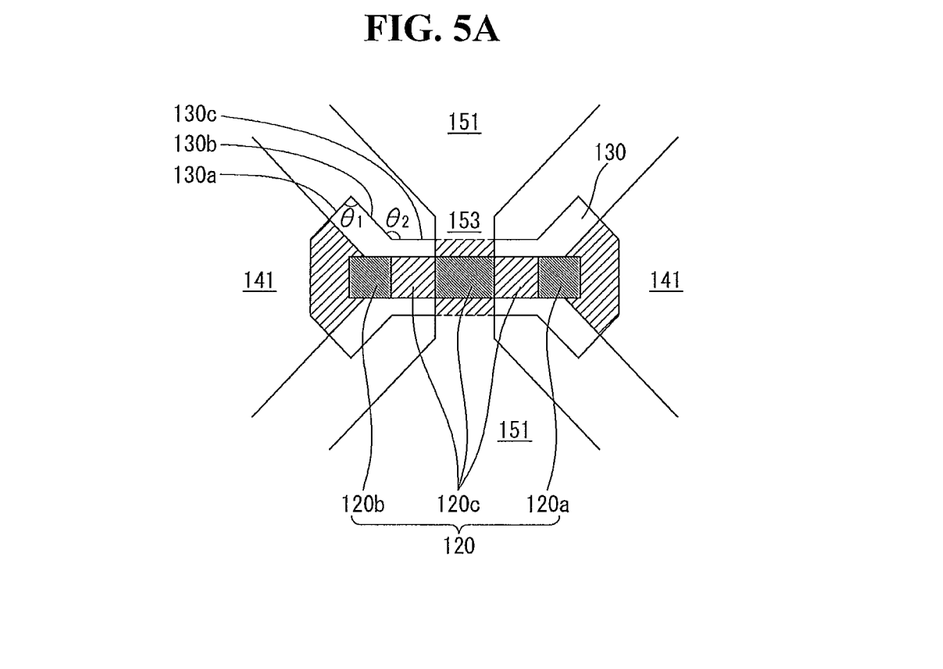
FIG. 5A is a plan view illustrating overlapping regions where an insulation pattern overlaps with other constituent elements including a first connection pattern, a second electrode pattern connection part, and first electrode patterns, and non-overlapping regions where the insulation pattern does not overlap with the other constituent elements.
Figure 5B:
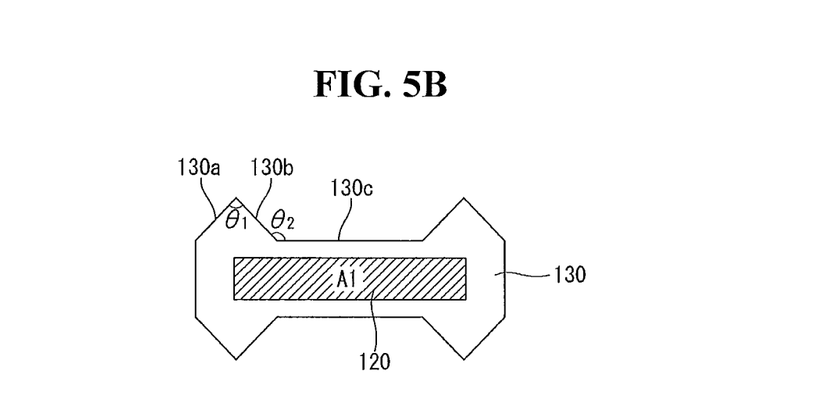
FIG. 5B is a plan view illustrating a region where the insulation pattern overlaps with the first connection pattern.
Figure 5C:
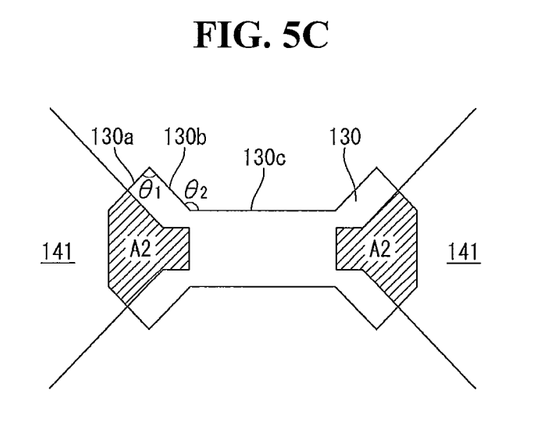
FIG. 5C is a plane view illustrating a region where the insulation pattern overlaps with the first electrode patterns.
Figure 5D:
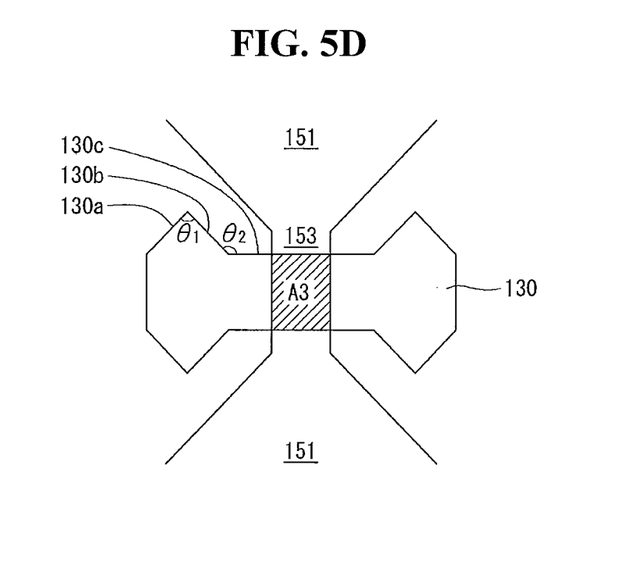
FIG. 5D is a plan view illustrating a region where the insulation pattern overlaps with the second electrode pattern connection part.
Figure 5E:
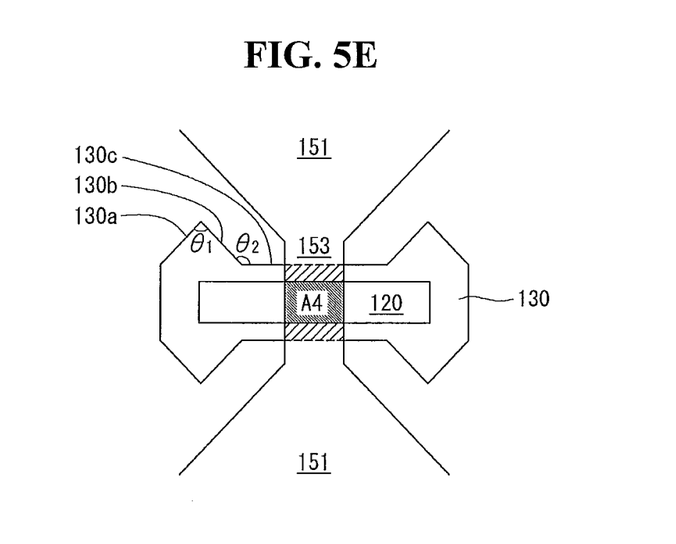
FIG. 5E is a plan view illustrating a region where the insulation pattern overlaps with the first electrode patterns and the second electrode pattern connection part.
Figure 5F:
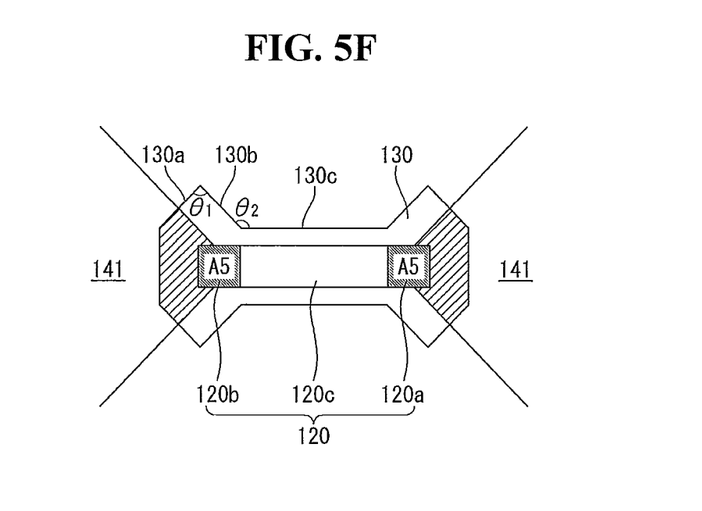
FIG. 5F is a plan view illustrating regions where the insulation pattern overlaps with the first connection pattern and the first electrode patterns.

In FIG. 5A, the insulation pattern 130 includes a single overlapping region with the first connection pattern 120 (a region A1 marked with diagonal lines, which is more specifically shown in FIG. 5B), single overlapping regions with the first electrode patterns 141 (regions A2 marked with diagonal lines, which are more specifically shown in FIG. 5C), a single overlapping region with the second electrode pattern connection part 153 (a region A3 marked with diagonal lines, which is more specifically shown in FIG. 5D), a double overlapping region with the first connection pattern 120 and the second electrode pattern connection part 153 (a black region A4, which is more specifically shown in FIG. 5E), and double overlapping regions with the first connection pattern 120 and the first electrode patterns 141 (black regions A5, which are more specifically shown in FIG. 5F).

FIGS. 5B to 5F are plan view for a better understanding of the overlapping regions. FIG. 5B is a plan view illustrating the region A1 where the insulation pattern 130 overlaps with the first connection pattern 120, FIG. 5C is a plan view illustrating the regions A2 where the insulation pattern 130 overlaps with the first electrode patterns 141, and FIG. 5D is a plan view illustrating the region A3 where the insulation pattern 130 overlaps with the second electrode pattern connection part 153. FIG. 5E is a plan view illustrating the region A4 where the insulation pattern 130 overlaps with the first connection pattern 120 and the second electrode pattern connection part 153, and FIG. 5F is a plan view illustrating the regions A5 where the insulation pattern 130 overlaps with the first connection pattern 120 and the first electrode patterns 141.

In FIGS. 5A to 5F, the insulation pattern 130 includes the overlapping regions A1 to A5 overlapping with the first connection pattern 120, the second electrode pattern connection part 153, and first electrode patterns 141, and the non-overlapping regions therewith. Also, the insulation pattern 130 has first to third sides 130a, 130b and 130c formed in the non-overlapping regions between the first electrode patterns 141 and the second electrode patterns 151. In such a configuration, the first side 130a extends from the first electrode pattern 141, the second side 130b extends from the first side 130a with a first angle θ1, and the third side 130c extends from the second side 130b to the second electrode pattern connection part 153 with a second angle θ2. The first angle θ1 formed by the first side 130a and the second side 130b has to be an acute angle so that the first and second sides 130a and 130b are protruded from the first electrode pattern 141 and the third side 130c. The second angle θ2 formed by the second side 130b and the third side 130c has to be an obtuse angle so that the third side 130c is refracted and extended to be perpendicular to the second electrode pattern connection part 153.

Figure 6:
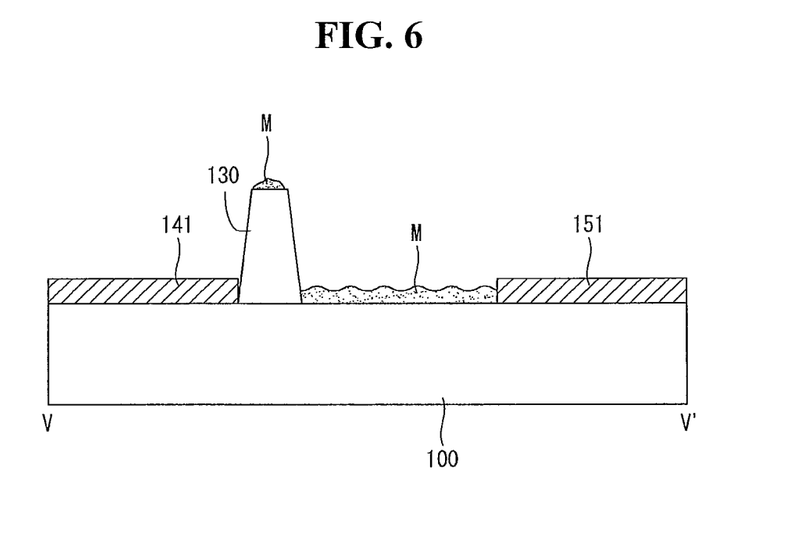
FIG. 6 is a sectional view taken along the line V-V' in FIG. 3, and is a schematic diagram illustrating a state where a short circuit between the first and second electrode patterns is prevented by hindering continuity of undesired conductive particles using two sides of the insulation pattern formed between the first and second electrode patterns.

As described above, the insulation pattern 130 has at least two sides (in this embodiment, the first to third sides 130a, 130b and 130c) formed between the first electrode patterns 141 and the second electrode patterns 151, and thus, as shown in FIG. 6, this hinders undesired conductive particles M from being formed continuously between the first electrode patterns 141 and the second electrode patterns 151. Therefore, it is possible to prevent the first electrode patterns 141 and the second electrode patterns 151 from being short-circuited. FIG. 6 is a sectional view taken along the line V-V' in FIG. 3, and is a schematic diagram illustrating a state where a short circuit between the first and second electrode patterns is prevented by hindering continuity of the undesired conductive particles M using the two sides of the insulation pattern formed between the first and second electrode patterns.

In the embodiment of this invention, although the insulation pattern 130 has the three sides 130a, 130b and 130c in the non-overlapping region between the first electrode patterns 141 and the second electrode patterns 151, this invention is not limited thereto. For example, the insulation pattern 130 may include bending parts or cut and curved parts which constitute one or more sides formed in the non-overlapping region between the first electrode patterns 141 and the second electrode patterns 151 so as to prevent a short circuit between the first and second electrode patterns through hindering continuity of the undesired conductive particles M by using the one or more side constituted by the bending parts or cut and curved parts. That is to say, this invention is also applicable to a protrusion configuration where the insulation pattern 130 formed in the non-overlapping region between the first electrode patterns 141 and the second electrode patterns 151 has one or more sides including not a straight linear form but at least one of a bending part and a cut and curved part, and a protrusion configuration where the insulation pattern 130 includes both the bending parts and the cut and curve parts.

For examples, the insulation pattern 130 may include a protrusion formed in the non-overlapping region among the first electrode patterns 141, the second electrode patterns 151 and the first connection pattern 120, and the protrusion has a convex shape with respect to the first connection pattern 120, wherein the protrusion may have one bending side to form the convex shape, or may have at least one cut and curved side, such as at least one straight linear side and at least one arc side, to form the convex shape.

In the embodiment of this invention, although the third side 130c extends from the second side 130b to the second electrode pattern connection part 153, the third side 130c may extend from the second side 130b to the second electrode patterns 151.

In the above-described touch screen panel according to the embodiment of this invention, the length of the step differences of the insulation pattern 130 formed between the first electrode patterns 141 and the second electrode patterns 151, which are used as touched electrodes, increases as compared with the related art, and therefore it is possible to prevent the first electrode patterns 141 and the second electrode patterns 151 from being short-circuited caused by undesired conductive particles.

Figure 7:
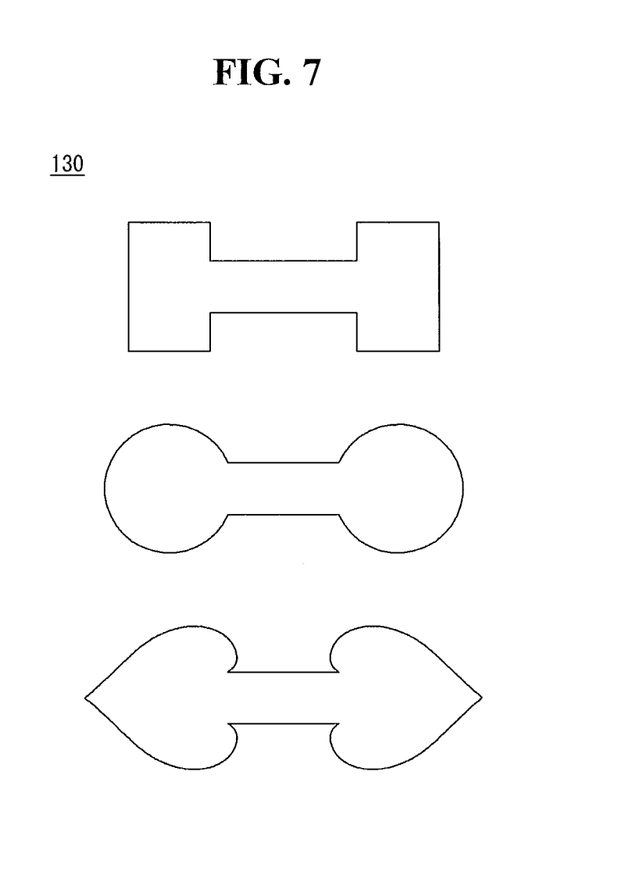
FIG. 7 is a plan view illustrating various shapes of insulation pattern according to another embodiment of this invention.

A shape of the insulation pattern 130 is not limited in above embodiment. For example, the insulation pattern may be implemented in various shapes as shown in FIG. 7.

The touch screen panel according to the embodiment of this invention may be applied to display devices including a liquid crystal display (LCD), a field emission display (FED), a plasma display panel (PDP), an electroluminescence device (EL), an electrophoresis display (EPD), and the like. In this case, the substrate of the touch screen panel according to the embodiment of this invention may be used as substrates of the display devices.

As described above, in the touch screen panel according to the embodiment of this invention, it is possible to prevent the first electrode patterns and the second electrode patterns from being short-circuited caused by undesired conductive particles accumulated in the step differences by increasing the paths of the step differences of the insulation patterns formed between the first and second electrode patterns. Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A capacitive touch screen panel, comprising:
a substrate;
a plurality of first electrode serials arranged in a first direction on the substrate;
a plurality of second electrode serials arranged in a second direction to intersect the first electrode serials; and
a plurality of insulation patterns formed at intersections of the first electrode serials and the second electrode serials and electrically insulating the first electrode serials from the second electrode serials,
wherein each of the plurality of first electrode serials includes a plurality of first electrode patterns which are separated from each other, and first connection patterns which are directly formed on the substrate under the insulation patterns, both ends of each of the first connection patterns electrically connecting the neighboring first electrode patterns to each other,
wherein each of the plurality of second electrode serials includes a plurality of second electrode patterns which are connected to each other at the intersections by second electrode pattern connection parts, each of the second electrode pattern connection parts connects neighboring second electrode patterns to each other, and
wherein each of the plurality of insulation patterns is formed to expose the both ends of the first connection patterns, and has a protrusion part which is formed between the first electrode patterns and the second electrode patterns to be non-overlapped with the first connection patterns, the second electrode pattern connection parts, and the second electrode patterns and to be overlapped with the first electrode patterns.

2. The capacitive touch screen panel of claim 1, wherein the protrusion part includes at least one of a bending part and a cut and curved part.

3. The capacitive touch screen panel of claim 1, wherein the protrusion part includes at least two sides forming a first angle with respect to each other, and the first angle is an acute angle.

4. The capacitive touch screen panel of claim 3, wherein the at least two sides include a first side and a second side, the first side extending from the first electrode pattern, and the second side extending from the first side with the first angle to one of the second electrode patterns and one of the second electrode pattern connection parts.

5. The capacitive touch screen panel of claim 3, wherein the at least two sides include first to third sides, the first side extending from the first electrode pattern, the second side extending from the first side with the first angle, the third side extending from the second side with a second angle to one of the second electrode pattern and the second electrode pattern connection part, and
wherein the first angle is an acute angle, and the second angle is an obtuse angle.

6. The capacitive touch screen panel of claim 1, wherein the first electrode patterns further include extending parts which cover at least one of end parts of the first connection patterns, and lateral sides and a portion of upper surfaces of the insulation patterns.

7. The capacitive touch screen panel of claim 1, wherein the first electrode patterns and the second electrode patterns are formed on a same surface of the substrate.

* * * * *